(12) United States Patent
Murata

(10) Patent No.: US 8,177,400 B2
(45) Date of Patent: May 15, 2012

(54) OUTER MIRROR WITH TURN LAMP

(75) Inventor: Yoshihiro Murata, Fujieda (JP)

(73) Assignee: Murakami Corporation, Shizuoka (JP)

( * ) Notice: Subject to any disclaimer, the term of this patent is extended or adjusted under 35 U.S.C. 154(b) by 155 days.

(21) Appl. No.: 12/831,356

(22) Filed: Jul. 7, 2010

(65) Prior Publication Data
US 2011/0051444 A1 Mar. 3, 2011

(30) Foreign Application Priority Data

Aug. 31, 2009 (JP) ................................. 2009-200842

(51) Int. Cl.
*B60Q 1/26* (2006.01)
(52) U.S. Cl. ......................... 362/494; 361/501; 361/546
(58) Field of Classification Search .................. 362/494, 362/498, 499, 501, 546
See application file for complete search history.

(56) References Cited

U.S. PATENT DOCUMENTS

| | | | | |
|---|---|---|---|---|
| 5,017,903 | A * | 5/1991 | Krippelz, Sr. ................. | 340/472 |
| 5,303,130 | A * | 4/1994 | Wei et al. ...................... | 362/494 |
| 5,707,132 | A * | 1/1998 | Ooki et al. ..................... | 362/522 |
| 6,299,334 | B1 * | 10/2001 | Schwanz et al. .............. | 362/511 |
| 6,637,917 | B2 * | 10/2003 | Schwanz et al. .............. | 362/487 |
| 6,897,614 | B2 * | 5/2005 | Matsumoto et al. ............ | 315/84 |
| 7,104,662 | B2 * | 9/2006 | Kawanishi .................... | 359/871 |
| 7,387,396 | B2 * | 6/2008 | Kawanishi et al. ............ | 359/871 |
| 7,467,883 | B2 * | 12/2008 | DeLine et al. ................ | 362/494 |
| 2004/0213009 | A1 * | 10/2004 | Yagi .............................. | 362/494 |
| 2007/0103921 | A1 * | 5/2007 | Kawanishi et al. ........... | 362/494 |

FOREIGN PATENT DOCUMENTS

JP 2006-290184 10/2006

OTHER PUBLICATIONS

U.S. Appl. No. 12/831,346 to Yoshihiro Murata, filed Jul. 7, 2010.

* cited by examiner

*Primary Examiner* — John A Ward
(74) *Attorney, Agent, or Firm* — Greenblum & Bernstein P.L.C.

(57) ABSTRACT

There is provided an outer mirror with turn lamp that facilitates assembling of a housing cover to a mirror housing and increases strength of the housing cover. A turn lamp assembly is mounted to a mirror housing. A housing cover is placed over and mounted to a partial area of the mirror housing. Thus, a lens of the turn lamp assembly is exposed through an opening formed in an outer position of the housing cover. The mirror housing and the housing cover are connected to each other with a ridge and a groove in end surfaces and abutting against and fitting each other. On a wall on an inner side of the mirror that constitutes a part of the component of the groove in the housing cover, at an assembling start position in an outer position outside the opening, an assembling leading rib is formed that protrudes in a direction abutting against the end surface of the mirror housing.

6 Claims, 4 Drawing Sheets

OUTER MIRROR WITH TURN LAMP

The disclosure of Japanese Patent Application No. JP2009-200842 filed on Aug. 31, 2009 including the specification, drawings, claims and abstract is incorporated herein by reference in its entirety.

BACKGROUND OF THE INVENTION

1. Field of the Invention

The present invention relates to an outer mirror with turn lamp that has a structure in which with a turn lamp assembly being mounted to a mirror housing, a housing cover is placed over and mounted to a partial area of the mirror housing, and a lens of the turn lamp assembly is exposed through an opening with a closed entire circumference formed in an outer position of the housing cover, and facilitates assembling of the housing cover to the mirror housing and increases strength of the housing cover.

2. Description of the Related Art

An outer mirror with turn lamp having the above-described structure is described in Japanese Patent Laid-Open No. 2006-290184. This outer mirror with turn lamp has a structure in which a groove and a ridge are formed in end surfaces of a mirror housing and a housing cover, and the end surfaces are abutted against each other so that the groove and the ridge fit each other to connect the mirror housing and the housing cover.

In the outer mirror with turn lamp described in Japanese Patent Laid-Open No. 2006-290184, the groove and the ridge are uniformly formed along abutting end surfaces of the mirror housing and the housing cover, and fitting between the groove and the ridge at an assembling start position is difficult in assembling the housing cover to the mirror housing. Even after the fitting between the groove and the ridge at the assembling start position, fitting between the groove and the ridge across the entire area is difficult, and the mirror housing and the housing cover are often connected to each other with the groove and the ridge partially not fitting each other. Since an outer region of the housing cover has an opening and thereby the outer region of the housing cover is reduced in strength, the fitting between the groove and the ridge is easily released when an impact is applied to the housing cover.

The present invention is achieved in view of the above-described points, and has an object to provide an outer mirror with turn lamp that facilitates assembling of a housing cover to a mirror housing and increases strength of the housing cover.

SUMMARY OF THE INVENTION

The present invention provides an outer mirror with turn lamp having a structure in which with a turn lamp assembly being mounted to a mirror housing, a housing cover is placed over and mounted to a partial area of the mirror housing, and a lens of the turn lamp assembly is exposed through an opening with a closed entire circumference formed in an outer position of the housing cover, wherein the mirror housing and the housing cover are connected to each other with end surfaces being abutted against each other, a groove is formed in an abutting end surface of the housing cover, a ridge that fits into the groove is formed in an abutting end surface of the mirror housing, and on a wall on an inner side of the mirror among inner and outer walls that constitute the groove in the housing cover, at an assembling start position in an outer position outside the opening, an assembling leading rib is formed that protrudes in a direction abutting against the abutting end surface of the mirror housing and first leads the ridge in the abutting end surface of the mirror housing into the groove at the assembling start position. According to this, the ridge in the abutting end surface of the mirror housing can be slid on a surface of the assembling leading rib and led into the groove at the assembling start position, thereby allowing the groove and the ridge to be easily fitted to each other at the assembling start position. Also, the assembling leading rib is formed in the outer position outside the opening in the housing cover, thereby increasing strength of the outer position outside the opening in the housing cover and preventing fitting between the groove and the ridge from being released when an impact is applied to the housing cover.

The assembling leading rib may have a length longer than a width of the opening, and be formed to extend to both sides of an area of the opening. This can further increase strength of the outer position outside the opening in the housing cover, and more reliably prevent fitting between the groove and the ridge from being released when an impact is applied to the housing cover.

On the wall on the inner side of the mirror among the inner and outer walls that constitute the groove in the housing cover, a plurality of protrusions that protrude in a direction abutting against the abutting end surface of the mirror housing and sequentially lead the ridge in the abutting end surface of the mirror housing into the groove may be placed at appropriate intervals in a position different from the position where the assembling leading rib is formed. According to this, the ridge of the mirror housing can be slid on surfaces of the protrusions on the housing cover and sequentially led into the groove even after assembling is started at the assembling start position, thereby preventing the mirror housing and the housing cover from being connected to each other with the groove and the ridge not fitting each other in a partial area.

The plurality of protrusions may be placed such that the interval increases along with the distance from the assembling leading rib. Specifically, as fitting between the groove and the ridge proceeds, misalignment between the groove and the ridge is less likely to occur in positions ahead of the fitted position, and thereby the groove and the ridge easily fit each other even if the intervals between the protrusions gradually become larger. This can eliminate the need for providing unnecessary protrusions, reduce the number of recesses for forming the protrusions, which are formed in a die for forming the housing cover, and reduce the number of steps for machining the die.

DETAILED DESCRIPTION OF THE PREFERRED EMBODIMENTS

Figure 2:
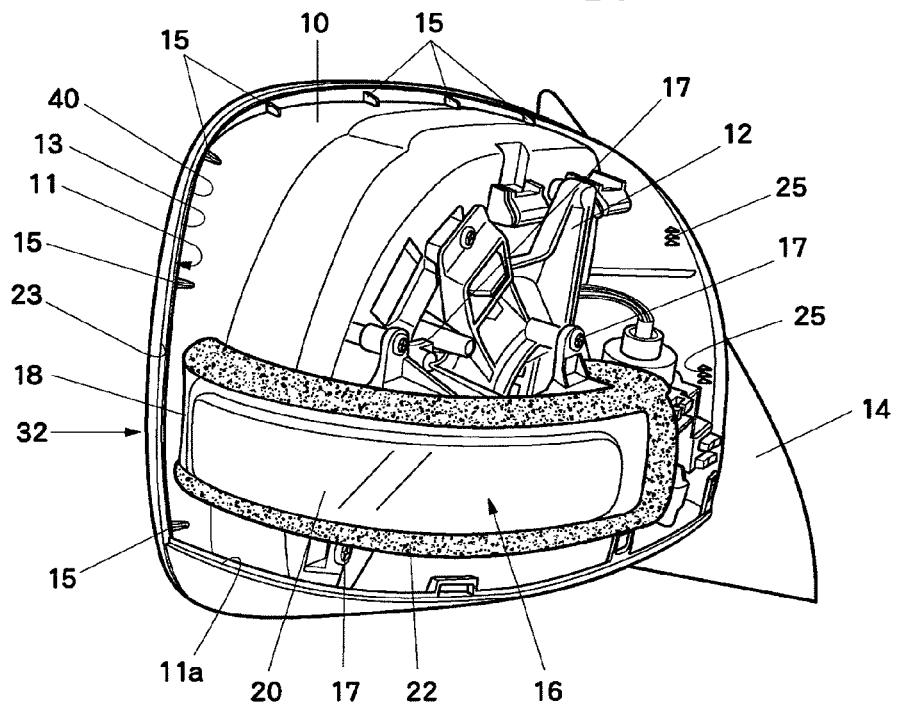
FIG. 2 shows the embodiment of the present invention, and shows a vehicle right side door mirror of the present invention viewed from an obliquely back side of the door mirror with the housing cover 24 in FIG. 1 being removed.

An embodiment of the present invention will be described. FIG. 2 shows a vehicle right side door mirror of the present invention viewed from an obliquely back side with a housing cover being removed. A frame 12 made of metal or glass fiber reinforced rigid plastic is removably mounted to a back surface of a plastic mirror housing 10 by threading screws from a front side of the mirror housing 10. The mirror housing 10 is supported by a mirror base 14 pivotably in retracting and returning directions. The mirror base 14 is mounted to a vehicle body (right door).

Figure 7:
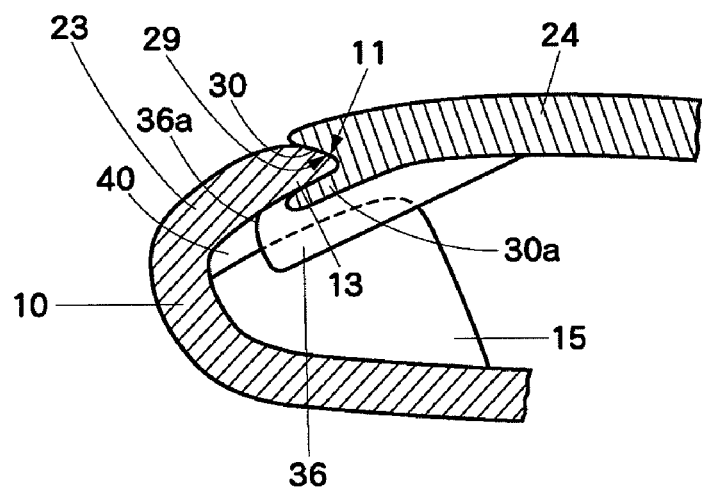
FIG. 7 is a sectional view taken along arrows B-B in FIG. 5.

An end surface 11 (surface abutting against an end surface 29 of the housing cover 24) of a peripheral edge of an area over which the housing cover 24 (FIG. 1) is placed of the mirror housing 10 is folded back outward except in a lower side 11a to constitute a folded portion 23. As shown in FIG. 7, the end surface 11 of the folded portion 23 constitutes a ridge 13. In a recess 40 formed on a back side of the folded portion 23, a plurality of ribs 15 are formed to protrude from a back surface of the mirror housing 10 toward the folded portion 23. When the housing cover 24 is placed over the mirror housing 10, the ribs 15 control a position of the end surface 29 of the housing cover 24 so that the end surface 29 does not enter the recess 40 inside the ridge 13.

In FIG. 2, in an outer region on the back surface of the mirror housing 10, the turn lamp assembly 16 is mounted by three upper and lower screws 17 threaded into screw holes formed in the back surface of the mirror housing 10 or the frame 12. The turn lamp assembly 16 has an outer shape curved to match a curved outer surface of the housing cover 24. The turn lamp assembly 16 is configured so that (a) light source(s) such as (an) LED(s) is (are) placed in a plastic lamp housing 18, and a transparent plastic lens 20 closes a front opening in the lamp housing 18. A packing member 22 made of such as sponge is bonded to a periphery of the lens 20 on the front surface of the turn lamp assembly 16.

Figure 1:
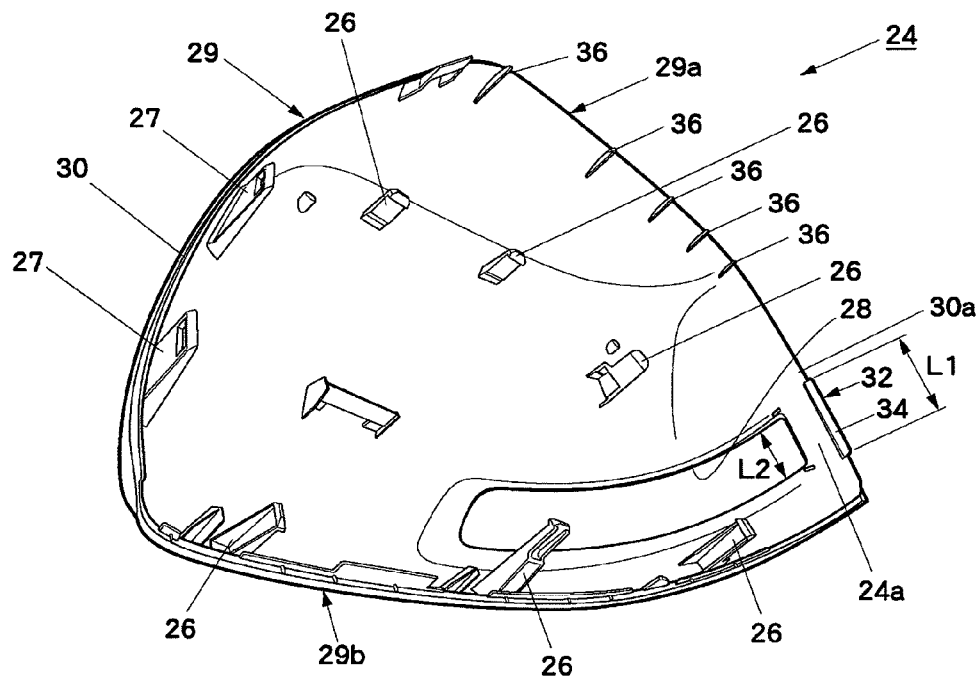
FIG. 1 shows an embodiment of the present invention, and shows a housing cover 24 viewed from a back side of the housing cover.

FIG. 1 shows the housing cover 24 which is to be mounted to the back surface of the mirror housing 10 in FIG. 2 viewed from a back side. The entire housing cover 24 is integrally molded of plastic. On a back surface of the housing cover 24, a plurality of hooks 26 (engaging pawls) are formed that engage (are hooked on) predetermined engaging portions on the mirror housing 10 or the frame 12 when the housing cover 24 is placed over the mirror housing 10 to mount the housing cover 24 to the mirror housing 10. In a different position on the back surface of the housing cover 24, a plurality of engaging portions 27 are formed that engage (are hooked on) hooks 25 (engaging pawls)(FIG. 2) formed on the mirror housing 10 when the housing cover 24 is placed over the mirror housing 10 to mount the housing cover 24 to the mirror housing 10.

In an outer region on the housing cover 24, an opening 28 with a closed entire circumference is formed through which the lens 20 of the turn lamp assembly 16 is exposed when the housing cover 24 is placed over the mirror housing 10. In the end surface (surface abutting against the end surface 11 of the mirror housing 10) 29 of the peripheral edge of the housing cover 24, a groove 30 into which the ridge 13 of the mirror housing 10 fits is formed except in a lower side 29b. In the housing cover 24, a portion in an outer position outside the opening 28 (a portion on the side far from the vehicle body) in the entire area of the abutting end surface 29 constitutes an assembling start position 32 to the mirror housing 10, and at the assembling start position 32, a wall 30a on an inner side of the mirror among inner and outer walls that constitute the groove 30 protrudes in a direction abutting against the abutting end surface 11 of the mirror housing 10 to constitute an assembling leading rib 34. When the housing cover 24 is placed over and assembled to the mirror housing 10, the assembling leading rib 34 first leads the ridge 13 of the mirror housing 10 into the groove 30 of the housing cover 24 at the assembling start position 32. The assembling leading rib 34 has a length L1 longer than a width (length in a lateral direction) L2 of the opening 28, and is formed to extend to both sides of the width of the opening 28.

On the wall 30a on the inner side of the mirror among the inner and outer walls that constitute the groove 30 in the housing cover 24, a plurality of protrusions 36 are formed in a position apart from the assembling leading rib 34 (in an upper side 29a of the abutting end surface 29) so as to protrude in a direction abutting against the end surface 11 of the mirror housing 10. The protrusions 36 sequentially lead the ridge 13 in the abutting end surface 11 of the mirror housing 10 into the groove 30 after assembling is started at the assembling start position 32, when the housing cover 24 is placed over and assembled to the mirror housing 10. A corner 36a (FIG. 7) facing the ridge 13 at a front end of the protrusion 36 is rounded so as to easily lead the ridge 13. The protrusions 36 are placed on the upper side 29a of the abutting end surface 29 of the housing cover 24 such that the interval increases along with the distance from the assembling leading rib 34. Specifically, as fitting between the groove 30 and the ridge 13 proceeds, misalignment between the groove 30 and the ridge 13 is less likely to occur in positions ahead of the fitted position, and the groove 30 and the ridge 13 easily fit each other even if the intervals between the protrusions 36 gradually become larger.

Figure 3:
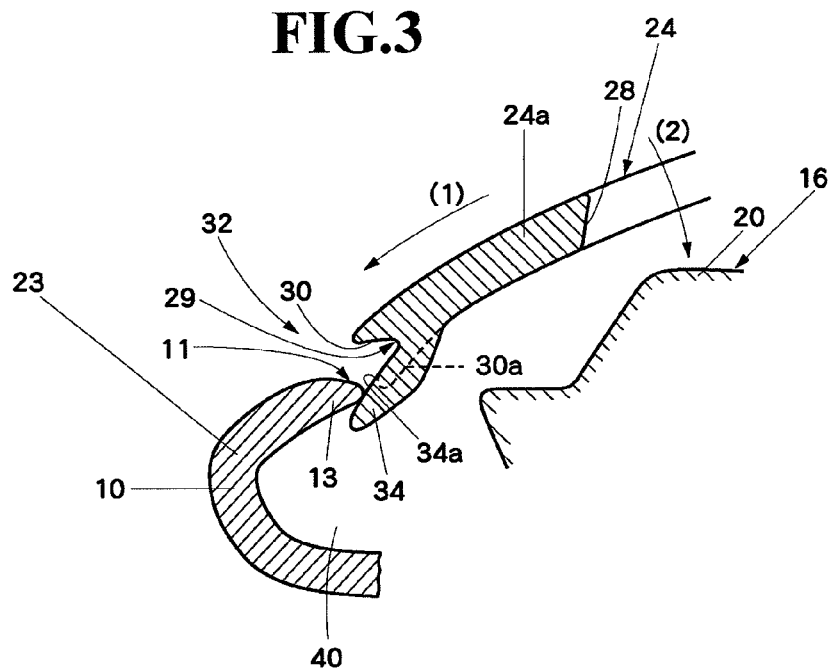
FIG. 3 is an enlarged sectional view showing a state where assembling is started at an assembling start position 32 when the housing cover 24 in FIG. 1 is placed over and assembled to a mirror housing 10 in FIG. 2, and shows a state immediately before a ridge 13 fits into a groove 30.
Figure 4:
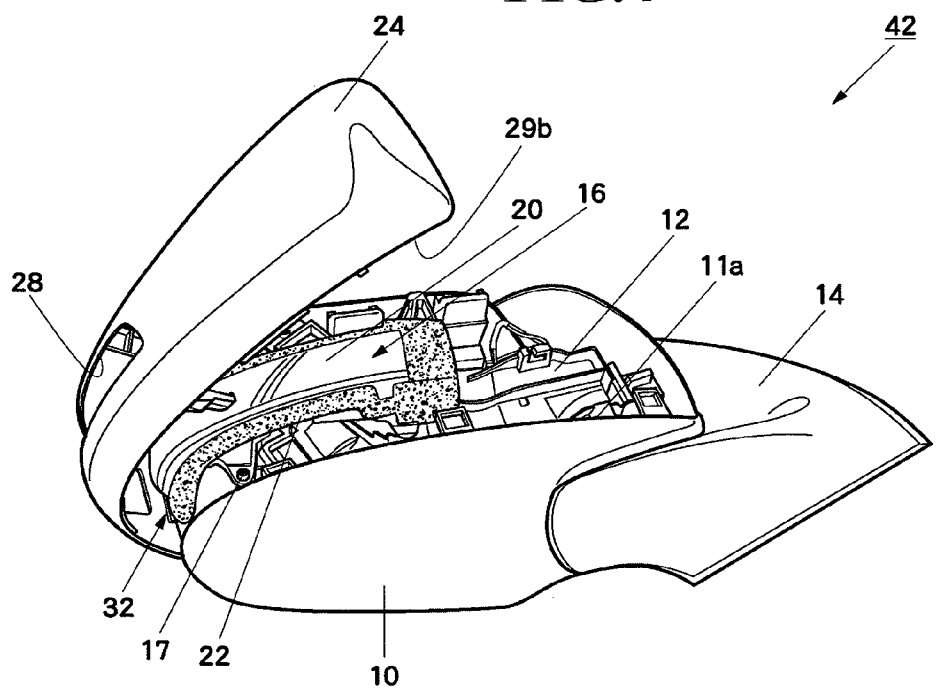
FIG. 4 is a perspective view showing a state of the mirror housing 10 and the housing cover 24 when the ridge 13 fits into the groove 30 at the assembling start position 32 when the housing cover 24 in FIG. 1 is placed over and assembled to the mirror housing 10 in FIG. 2.

FIG. 3 is an enlarged sectional view showing a state where assembling is started at the assembling start position 32 when the housing cover 24 is placed over and assembled to the mirror housing 10. At the assembling start position 32, the abutting end surface 11 of the mirror housing 10 and the abutting end surface 29 of the housing cover 24 are abutted against each other. Specifically, an upper surface 34a of the assembling leading rib 34 is abutted against the ridge 13 of the mirror housing 10, and the housing cover 24 is slid in a direction of arrow (1) to fit the ridge 13 into the groove 30. FIG. 4 shows a state of the mirror housing 10 and the housing cover 24 when the ridge 13 fits into the groove 30 at the assembling start position 32. Then, the housing cover 24 is pivoted in a direction of arrow (2) in FIG. 3 around a position where the ridge 13 and the groove 30 fit each other to sequentially abut the abutting end surface 11 of the mirror housing 10 and the abutting end surface 29 of the housing cover 24 against each other across the entire area. At this time, the protrusions 36 on the housing cover 24 enter the recess 40 inside the ridge 13 of the mirror housing 10 and lead the ridge 13 into the groove 30 (see FIG. 7). The ribs 15 formed in the recess 40 control the position of the end surface 29 of the housing cover 24 so that the end surface 29 does not enter the recess 40 inside the ridge 13 (see FIG. 7). As such, the housing cover 24 is placed over the mirror housing 10 to expose the lens 20 of the turn lamp assembly 16 through the opening 28. Finally, the peripheral edge of the housing cover 24 is firmly pressed against the mirror housing 10, and thus the plurality of hooks 26 (FIG. 1) formed on the inner surface of the housing cover 24 engage the engaging portions formed on the mirror housing 10 or the frame 12, and the plurality of hooks 25 (FIG. 2) formed on the inner surface of the mirror housing 10 engage the engaging portions 27 (FIG. 1) on the housing cover 24 to mount the housing cover 24 to the mirror housing 10. Thus, the assembling is completed.

Figure 5:
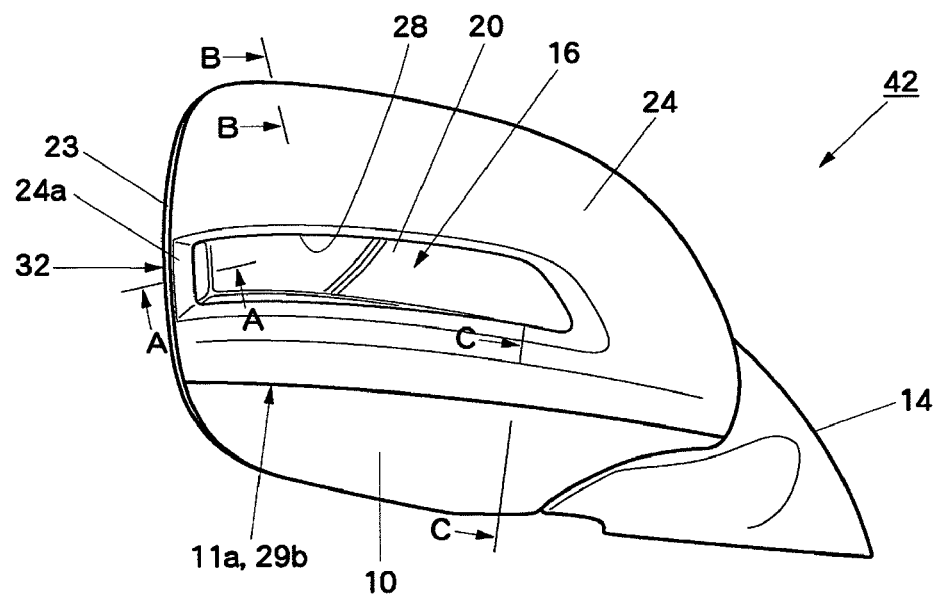
FIG. 5 is a perspective view of the door mirror viewed from the back side, showing a state where the assembling of the housing cover 24 to the mirror housing 10 is completed.
Figure 6:
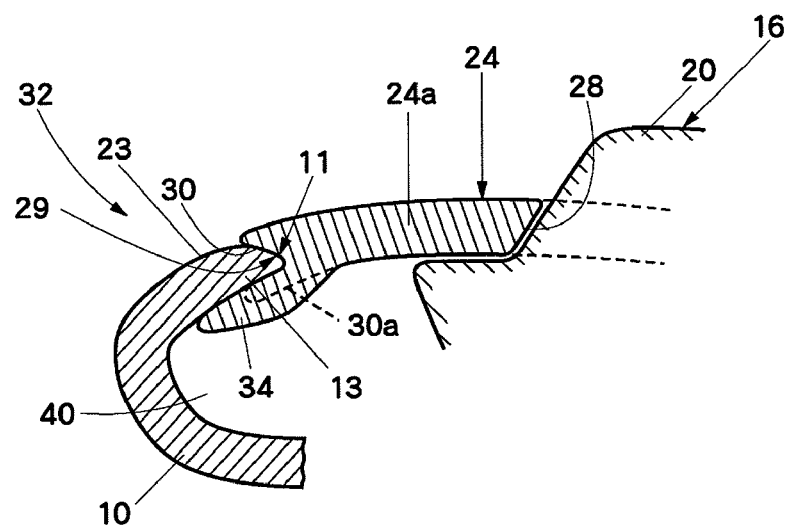
FIG. 6 is a sectional view taken along arrows A-A in FIG. 5.
Figure 8:
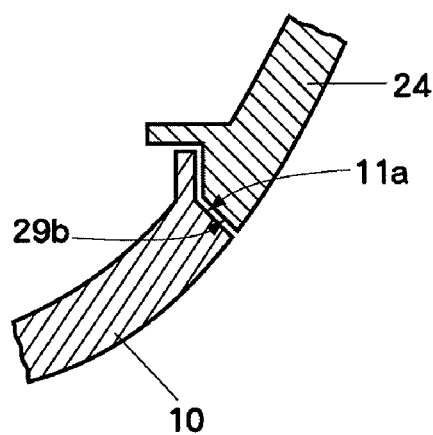
FIG. 8 is a sectional view taken along arrows C-C FIG. 5.

FIG. 5 shows the vehicle right side door mirror 42 after the assembling is completed. FIGS. 6, 7 and 8 show sections taken along arrows A-A, B-B and C-C in FIG. 5. As shown in FIGS. 6 and 7, the ridge 13 and the groove 30 fit each other across the entire area. In FIG. 6, the assembling leading rib 34 is formed in an outer position 24a outside the opening 28 in the housing cover 24, thereby increasing strength of the position 24a. This prevents fitting between the groove 30 and the ridge 13 from being released when an impact is applied to the housing cover 24. As shown in FIG. 8, the lower side 11a of the abutting end surface 11 of the mirror housing 10 and the lower side 29b of the abutting end surface 29 of the housing cover 24 are abutted against each other so that recessed parts and projecting parts in the lower sides mesh with each other.

What is claimed is:

1. An outer mirror with turn lamp having a structure in which with a turn lamp assembly being mounted to a mirror housing, a housing cover is placed over and mounted to a partial area of the mirror housing, and a lens of the turn lamp assembly is exposed through an opening with a closed entire circumference formed in an outer position of the housing cover,
    wherein the mirror housing and the housing cover are connected to each other with end surfaces being abutted against each other,
    a groove is formed in an abutting end surface of the housing cover,
    a ridge that fits into the groove is formed in an abutting end surface of the mirror housing, and
    on a wall on an inner side of the mirror among inner and outer walls that constitute the groove in the housing cover, at an assembling start position in an outer position outside the opening, an assembling leading rib is formed that protrudes in a direction abutting against the abutting end surface of the mirror housing and first leads the ridge in the abutting end surface of the mirror housing into the groove at the assembling start position.

2. The outer mirror according to claim 1, wherein the assembling leading rib has a length longer than a width of the opening, and is formed to extend to both sides of an area of the opening.

3. The outer mirror according to claim 1, wherein on the wall on the inner side of the mirror among the inner and outer walls that constitute the groove in the housing cover, a plurality of protrusions that protrude in a direction abutting against the abutting end surface of the mirror housing and sequentially lead the ridge in the abutting end surface of the mirror housing into the groove are placed at appropriate intervals in a position different from the position where the assembling leading rib is formed.

4. The outer mirror according to claim 2, wherein on the wall on the inner side of the mirror among the inner and outer walls that constitute the groove in the housing cover, a plurality of protrusions that protrude in a direction abutting against the abutting end surface of the mirror housing and sequentially lead the ridge in the abutting end surface of the mirror housing into the groove are placed at appropriate intervals in a position different from the position where the assembling leading rib is formed.

5. The outer mirror according to claim 3, wherein the plurality of protrusions are placed such that the interval increases with the distance from the assembling leading rib.

6. The outer mirror according to claim 4, wherein the plurality of protrusions are placed such that the interval increases with the distance from the assembling leading rib.

* * * * *